L. L. Bond.
Hoe.

No. 99,821.      Patented Feb. 15, 1870.

WITNESSES:

INVENTOR:
Lester L. Bond

United States Patent Office.

LESTER L. BOND, OF CHICAGO, ILLINOIS.

Letters Patent No. 99,821, dated Febrvray 15, 1870.

IMPROVEMENT IN HOES.

The Schedule referred to in these Letters Patent and making part of the same.

*To all whom it may concern:*

Be it known that I, LESTER L. BOND, of the city of Chicago, in the county of Cook, and State of Illinois, have invented certain new and useful Improvements in the Manufacture of Hoes; and I do hereby declare that the following is a full, clear, and exact description of the same, reference being had to the accompanying drawings, making a part of this specification, in which—

Figure 1:
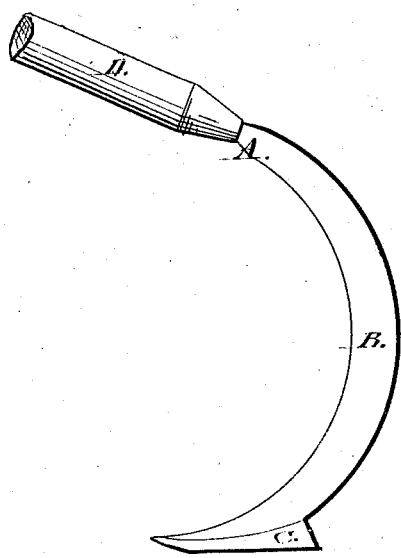

Figure 1 represents a side view with a portion of the handle.

Figure 2:
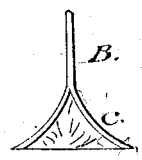

Figure 2, a rear view of the hoe part.

Figure 3:
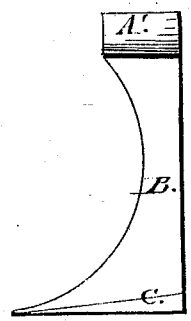

Figure 3, a side view, with a different form of shank and mode of attaching the handle.

Figure 4:
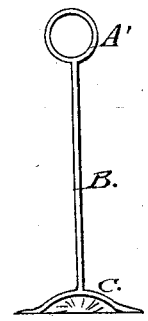
Figure 5:
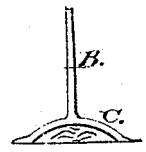
Figure 6:

Figures 4, 5, and 6, rear views, with modification of hoes.

The nature of my invention consists in constructing a hand hoe with a long sharp shank, so that the earth may be stirred or loosened beneath the surface in gardening and for other purposes.

To enable others skilled in the art to make and use my hoe, I will describe its construction and operation.

A is the tang, and A' an eye, by which an ordinary wood handle, D, is attached to the hoe.

B is a curved shank or blade, made thin and sharp at the front edge.

C is the flanged or hoe part.

I usually make my hoe of a single piece of steel; but the part C may be made of a separate piece, and riveted on if desired, and in size the best proportions will be to make the hoe ten inches high; that is, ten inches from the lower point of the hoe to the end of the handle; the measurement to be in a straight line. A greater distance will not injure its operation, while a lesser will detract somewhat from its usefulness; but it will still be a valuable implement even with the sharp blade or shank of a length of only three or four inches.

The shank or blade B is made of steel, and is about one inch in width and three-sixteenths of an inch in thickness.

The part C is made of the same material and thickness, and is from one to three inches across at the heel, and is brought to a point in front, and made sharp at the edges. Its form may be varied as shown. It is used to stir the ground down as deep as it has been plowed or spaded, so as to keep the plants below the surface. It can also be used as a scarifier by holding it up, as it is sharp, and being sharp both in the hoe and shank it is very easy to operate.

Having thus fully described my improvement,

What I claim as new, and desire to secure by Letters Patent, is—

The herein-described hoe, provided with an elongated and sharp shank or blade, as a new article of manufacture.

LESTER L. BOND.

Witnesses:
E. A. WEST,
O. W. BOND.